L. A. SHELDON.
FLOW METER.
APPLICATION FILED JULY 18, 1918.
1,359,846.   Patented Nov. 23, 1920.
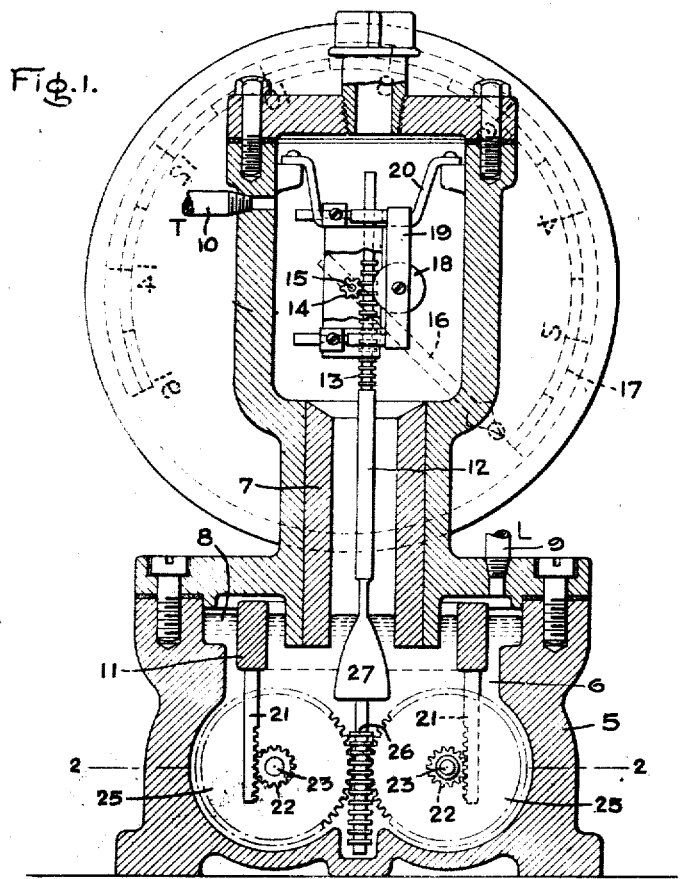
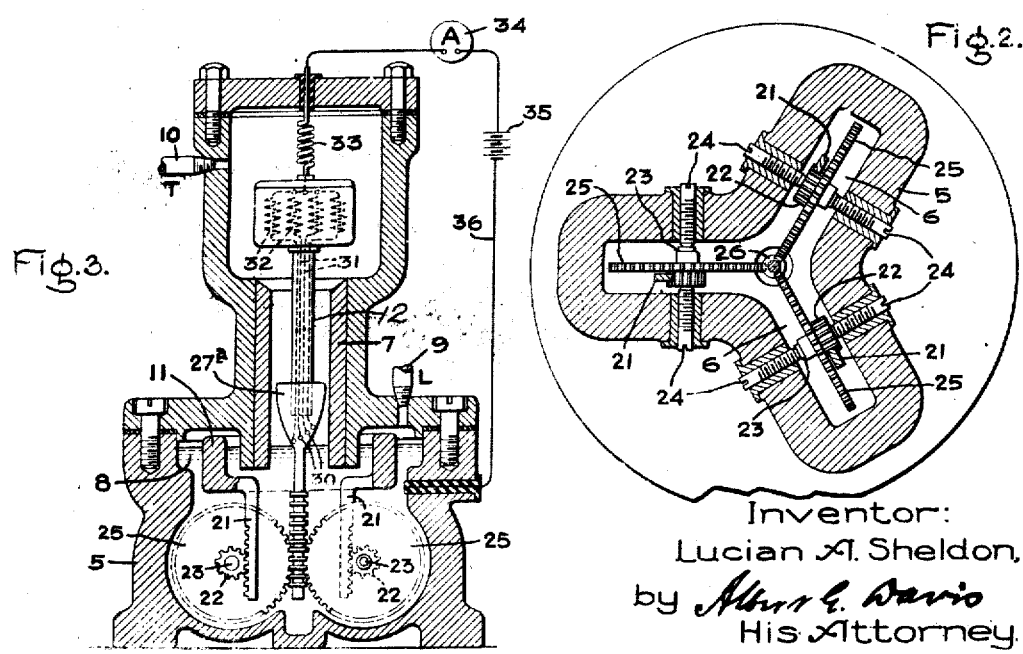
Inventor:
Lucian A. Sheldon,
by Albert G. Davis
His Attorney.

UNITED STATES PATENT OFFICE.

LUCIAN A. SHELDON, OF SCHENECTADY, NEW YORK, ASSIGNOR TO GENERAL ELECTRIC COMPANY, A CORPORATION OF NEW YORK.

FLOW-METER.

1,359,846.  Specification of Letters Patent. Patented Nov. 23, 1920.

Application filed July 18, 1918. Serial No. 245,441.

*To all whom it may concern:*

Be it known that I, LUCIAN A. SHELDON, a citizen of the United States, residing at Schenectady, in the county of Schenectady, State of New York, have invented certain new and useful Improvements in Flow-Meters.

The present invention relates to flow meters of the U-tube type wherein a pressure difference creating device located in a conduit through which the fluid to be metered flows is connected by suitable pipes to the leading and trailing sides of the U-tube instrument, thus subjecting the two legs of the U-tube to a pressure difference which bears a definite relation to the rate of flow of fluid through the conduit, thereby causing a deflection of the indicating liquid contained in the U-tube. Such deflection is then transmitted to suitable indicating or indicating and recording mechanism.

One object of my invention is to provide an improved U-tube instrument embodying mechanism for multiplying the deflection of the liquid in the U-tube before it is transmitted to the indicating or indicating and recording mechanism so that for a small change in the deflection of such liquid a large movement is available for use in connection with the indicating or indicating and recording mechanism.

As is well known, the pressure differences set up by a pressure difference creating device are not a straight line function of the rate of flow and a further object of my invention is to provide an improved arrangement in which the indicating instrument will have a uniform scale.

For a consideration of what I believe to be novel and my invention, attention is directed to the accompanying description and the claims appended thereto.

In the drawing, Figure 1 is a vertical sectional view of a U-tube indicating instrument embodying my invention; Fig. 2 is a section taken on line 2—2 Fig. 1; and Fig. 3 is a view similar to Fig. 1 showing a modification.

Referring to the drawing, 5 indicates a base containing a chamber 6, and 7 indicates a tube which extends from a point within chamber 6 to a point well above it. In chamber 6 is a suitable indicating liquid 8, as mercury, and as is well understood this forms a known type of U-tube, the tube 7 being one leg thereof and the space in chamber 6 which surrounds tube 7 being the other leg. 9 indicates the leading pressure pipe and 10 the trailing pressure pipe and these pipes lead from any suitable form of pressure difference creating device (not shown) in the well known manner.

In the leading leg of the U-tube is an annular float 11 which rides on the liquid therein and in the trailing leg of the U-tube is a stem 12 having at its upper end a circular rack 13 which meshes with a small pinion 14 on a shaft 15. On shaft 15 is a pointer 16 which moves over a scale plate 17. The upper end of stem 12 is guided in its movements by a roller 18 carried by a suitable frame 19 supported by a bracket 20. Movement is transmitted from the annular float 11 to stem 12 through a multiplying arrangement so that a small vertical movement of the float will effect a relatively large vertical movement of the stem. This result may be accomplished in various ways but preferably I utilize a multiplying gearing. In the present instance the float is provided with three depending racks 21 which mesh with pinions 22 on short shafts 23. Shafts 23 are carried on suitable pivot screws 24, and on each of them is a gear wheel 25 which meshes with a circular rack 26 on the lower end of stem 12. As the float 11 rises and lowers such movements will be transmitted to stem 12 through pinions 22 and gear 25 and the amount which the movements are multiplied will of course depend on the relative diameters of the gear wheels and pinions. With the structure illustrated the base 5 may with advantage have the contour shown in Fig. 2.

As already stated, the pressure difference set up by a pressure difference creating device is not a straight line function of the rate of flow and in order to correct for this and thereby obtain a uniform scale I provide on the lower portion of stem 12 a suitably shaped enlargement 27 which is immersed to a greater or lesser extent in the liquid 8 according to the liquid deflection, thereby varying the proportion of the deflection which takes place in the leading leg and hence the amount of movement of float 11.

In Fig. 3 I have shown a modification in which the liquid deflections in the U-tube are transmitted electrically. To this end an enlargement 27ᵃ corresponding to enlargement 27 of Fig. 1 is provided with a plurality of vertically spaced contacts 30 from which lead conductors 31 containing suitable resistances 32 and connected to a common conductor 33 which leads to a suitable indicating circuit. In the present instance conductor 33 is connected to an ammeter 34 and one side of a source of current 35, the other side being connected by a conductor 36 to the liquid 8 in chamber 6. Enlargement $27^a$ is arranged above the indicating liquid 8 and the float 11 is so connected by racks 21 to pinions 22 and gear wheels 25 that the float 11 and stem 12 move simultaneously in the same direction; that is a lowering of float 11 lowers stem 12 and an upward movement of float 11 raises stem 12. The movement of stem 12 and hence of enlargement $27^a$ is therefore always in a direction opposite to that of the deflection of the liquid in the trailing leg 7 of the U-tube, and hence the relative movement of enlargement $27^a$ and the liquid in the trailing leg 7 is the sum of their individual movements.

In operation, as the float 11 moves vertically the enlargement $27^a$ is to a greater or lesser extent immersed in the liquid 8, which may be mercury. As it moves into the liquid 8, resistances 32 are successively connected in parallel thus decreasing the resistance of the indicating circuit and increasing the flow of current; as it moves out of the liquid the resistances are successively cut out of parallel, thus decreasing the current flowing in the indicating circuit.

Owing to the large relative movement of the enlargement $27^a$ and the liquid 8 which results from the above arrangement, the contacts 30 can be spaced without difficulty a sufficient distance apart in a vertical direction to make them distinctive and to permit of indicating small changes in flow. The shape of enlargement $27^a$ is such as to give a uniform spacing of contacts 30 for equal changes in flow which corresponds to obtaining a uniform scale as pointed out above in connection with Figs. 1 and 2.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. In an indicating instrument, a U-tube comprising a leading leg and a trailing leg, a float in one leg, a movable element in the other leg, and means connecting the float and element together which effects a multiplication of the movement which the float transmits to the element.

2. In an indicating instrument, a U-tube comprising an annular chamber and a vertical tube, an annular float in said chamber, a vertically movable stem in said tube, and means connecting the float to the stem which effects a multiplication of the movement which the float transmits to the stem.

3. In an indicating instrument, a U-tube comprising an annular chamber and a vertical tube, an annular float in said chamber, a vertically movable stem in said tube, and multiplying gearing which connects the float to the stem and through which movement is transmitted from the one to the other.

4. In an indicating instrument, a U-tube comprising an annular chamber and a vertical tube, an annular float in said chamber, a vertically movable stem in said tube, and means connecting the float to the stem which effects a multiplication of the movement which the float transmits to the stem, the contour of the passage formed between the stem and the inner wall of said tube being such as to give equal movements of the stem for equal changes in the flow of the fluid being metered.

5. In an indicating instrument, a U-tube comprising a leading leg and a trailing leg, a float in one leg, a movable element in the other leg, means connecting the float and element together which effects a multiplication of the movement which the float transmits to the element, and indicating means actuated by the movements of said element.

6. In an indicating instrument, a U-tube comprising an annular chamber and a vertical tube, an annular float in said chamber, a vertically movable stem in said tube, means connecting the float to the stem which effects a multiplication of the movement which the float transmits to the stem, and indicating means actuated by the movements of said stem.

7. In an indicating instrument, a U-tube comprising a leading leg and a trailing leg, a float in one leg, a movable element in the other leg, and means connecting the float and element together which effects a multiplication of the movement which the float transmits to the element, said connecting means being so arranged as to move the element in the same direction the float moves.

8. In an indicating instrument, a U-tube comprising a leading leg and a trailing leg, an indicating fluid therein, a float in one leg, a movable element in the other leg, vertically spaced electrical contacts on said movable element, and means connecting the float to said element so that the float moves the element in a direction opposite to that in which the indicating fluid in such other leg moves.

9. In an indicating instrument, a U-tube comprising a leading leg and a trailing leg, a float in one leg, a movable element in the other leg, vertically spaced electrical contacts on said movable element, and means connecting the float and element together which effects a multiplication of the movement which the float transmits to the element, said means moving the element in the same direction in which the float moves.

10. In an indicating instrument, a U-tube comprising a leading leg and a trailing leg, a float in one leg, a movable element in the other leg, vertically spaced electrical contacts on said movable element, and means connecting the float to said element so that the float moves the element in a direction opposite to that in which the indicating fluid in such other leg moves, the contour of the passage formed between said element and the inner wall of the leg in which it moves being such as to give equal movements of the element for equal changes in the flow of the fluid being metered.

11. In an indicating instrument, a U-tube comprising an annular chamber and a vertical tube, an annular float in said chamber, a vertically movable stem in said tube, means connecting the float to the stem which effects a multiplication of the movement which the float transmits to the stem and an enlargement on said stem so shaped that it forms with the inner wall of the tube a passage of such contour that equal changes in the rate of flow of the fluid being metered result in equal movements of the stem.

12. In an indicating instrument, a U-tube comprising an annular chamber and a vertical tube, an annular float in said chamber, a vertically movable stem in said tube, an enlargement on said stem so shaped that it forms with the inner wall of said tube a passage of such contour that equal changes in the rate of flow of the fluid being metered result in equal movements of the stem, spaced electrical contacts on said stem, an indicating circuit connected to said contacts, and means connecting said float to said stem.

13. In an indicating instrument, a U-tube comprising an annular chamber and a vertical tube, an annular float in said chamber, a vertically movable stem in said tube, an enlargement on said stem so shaped that it forms with the inner wall of said tube a passage of such contour that equal changes in the rate of flow of the fluid being metered result in equal movements of the stem, spaced electrical contacts on said stem, an indicating circuit connected to said contacts, and means connecting said float to said stem which effects a multiplication of the movement which the float transmits to the stem.

14. In an indicating instrument, a U-tube comprising an annular chamber and a vertical tube, an indicating fluid therein, an annular float in said chamber, a vertically movable stem in said tube, an enlargement on said stem so shaped that it forms with the inner wall of said tube a passage of such contour that equal changes in the rate of flow of the fluid being metered result in equal movements of the stem, spaced electrical contacts on said stem, an indicating circuit connected to said contacts, and means connecting said float to said stem which moves the stem in a direction opposite to that in which the indicating fluid in the tube moves.

15. In an indicating instrument, a U-tube comprising an annular chamber and a vertical tube, an indicating fluid therein, an annular float in said chamber, a vertically movable stem in said tube, an enlargement on said stem so shaped that it forms with the inner wall of said tube a passage of such contour that equal changes in the rate of flow of the fluid being metered result in equal movements of the stem, spaced electrical contacts on said stem, an indicating circuit connected to said contacts, and means connecting said float to said stem which effects a multiplication of the movement which the float transmits to the stem and moves the stem in a direction opposite to that in which the indicating fluid in the tube moves.

In witness whereof, I have hereunto set my hand this 17th day of July, 1918.

LUCIAN A. SHELDON.